United States Patent [19]
Foukes et al.

[11] Patent Number: 5,498,783
[45] Date of Patent: Mar. 12, 1996

[54] POWDER COATING COMPOSITION RESISTANT TO OVERSPRAY INCOMPATIBILITY DEFECTS

[75] Inventors: Richard J. Foukes, Utica; Cynthia A. Stants, Pinckney, both of Mich.

[73] Assignee: BASF Corporation, Southfield, Mich.

[21] Appl. No.: 294,123

[22] Filed: Aug. 22, 1994

[51] Int. Cl.$^6$ ................................................. C08L 67/02
[52] U.S. Cl. .................. 525/165; 525/107; 525/119; 525/124; 525/176; 525/187; 525/190; 525/423; 525/424; 525/425; 525/426; 525/428; 525/452; 525/529; 525/533
[58] Field of Search .................. 525/107, 119, 525/124, 165, 176, 423, 425, 426, 428, 903, 934, 187, 190, 424, 452, 529, 533

[56] References Cited

U.S. PATENT DOCUMENTS

| | | | |
|---|---|---|---|
| 3,978,153 | 8/1976 | Sato et al. | 525/143 |
| 4,476,261 | 10/1984 | Patzschke et al. | 523/402 |
| 4,499,239 | 2/1985 | Murakami et al. | 525/176 |
| 4,568,606 | 2/1986 | Hart et al. | 428/379 |
| 4,751,267 | 6/1988 | Berghoff | 525/133 |
| 4,824,909 | 4/1989 | Togo et al. | 525/131 |
| 4,897,450 | 1/1990 | Craun et al. | 525/176 |
| 5,182,337 | 1/1993 | Pettit, Jr. et al. | 525/176 |
| 5,300,573 | 4/1994 | Patel | 525/122 |
| 5,326,820 | 7/1994 | Hoffmann et al. | 525/123 |
| 5,326,821 | 7/1994 | Sasaki et al. | 525/176 |
| 5,342,893 | 8/1994 | Wilkinson et al. | 525/176 |
| 5,350,810 | 9/1994 | De Graaf et al. | 525/10 |

FOREIGN PATENT DOCUMENTS 60-168771  9/1985  Japan.

OTHER PUBLICATIONS

S. C. Johnson & Son Inc. Racine, Wis, New Thermosetting Acrylics Espand Powder Coating Versitility, Jun. 1989.

Primary Examiner—Melvyn I. Marquis
Assistant Examiner—Randy Gulakowski
Attorney, Agent, or Firm—Anne Gerry Sabourin

[57] ABSTRACT

A thermosetting powder coating composition resistant to overspray incompatibility defects that comprises solid particulates of a uniform mixture of (a) a polyester resin having an average of two or more carboxyl groups, (b) a first crosslinker that is reactive toward the carboxyl groups of the polyester resin, (c) from 1% to 20% of a reactive acrylic copolymer having a weight average molecular weight of from 10,000 to 40,000, and (d) a second crosslinker that is reactive toward the reactive functionality of the acrylic copolymer is described.

12 Claims, No Drawings

POWDER COATING COMPOSITION RESISTANT TO OVERSPRAY INCOMPATIBILITY DEFECTS

BACKGROUND OF THE INVENTION

The present invention concerns thermosetting powder coating compositions and methods for coating substrates with such compositions. In particular, the invention relates to thermosetting powder coating compositions resistant to overspray incompatibility defects, such as cratering or fuzziness, and use of such compositions.

Powder coating compositions have become increasingly important because they give off very little volatile material to the environment when cured. Typically, such emissions are limited to by-products of the curing reaction, such as blocking agents or volatile condensation products.

Powder coatings have found use as both decorative coatings and protective coatings. One commercial use of powder coating compositions is as an automotive primer, such as, for example, a primer applied to the lower panels of a vehicle for the purpose of increasing the resistance to damage from stone-chipping and other such impacts. This kind of primer is often based on polyester technology due to its impact strength. Such primers are usually overcoated with a topcoat such as a one-coat enamel or a basecoat/clearcoat topcoat system.

In addition to excellent chipping resistance, polyester-based powder primers have a large application range, typically 50 to 250 microns, over which they may be used to produce quality films. These compositions may be applied at the lower filmbuilds as a standard primer or at higher filmbuilds in areas where increased impact or stonechipping resistance is desired. Polyester-based powder primers are also preferred for their excellent handling characteristics. Such powder coatings have excellent fluidizability and a wide application window (i.e. they may be applied under widely varying ambient conditions). In addition, polyester-based powder compositions have relatively long storage stabilities of over a year and are particularly resistant to impact fusion.

Powder coatings have also found use as blackout primers. Blackout primers are used on surfaces that will not be coated with a topcoat, such as the inside of the hood or trunk lid or on support pillars. Such primers also find use in two-tone applications. Because blackout primers will not be overcoated with a topcoat, they must have acceptable weathering characteristics. In other words, they must be resistant to chalking, loss of gloss, and other defects caused by exposure to the elements. Such blackout primers are usually based on acrylic technologies.

Although they have excellent weathering characteristics, acrylic powder coating compositions are less resistant to impact and stone-chipping damage when compared to polyester-based compositions. Acrylic powder primers are also more expensive, have poorer handling characteristics, have a much smaller application window, and poorer storage stability when compared to the polyester powder primers. However, their excellent exterior durability, superior smoothness and gloss, and better mar resistance makes them the preferred materials for many applications, such as the described use as blackout primers.

It would be desirable, then, to combine the use of both primers on articles where different areas require different types of protection. On an automobile or truck body, for example, the lower body can most advantageously be coated with the polyester-based powder primer for optimum chipping resistance, while the upper body areas and areas that will not be overcoated are optimally coated with an acrylic powder primer.

It would be advantageous to apply both types of primers in the same zone and cure both simultaneously. Application in the same zone and simultaneous curing provides an economical use of time and energy, while consecutive application and curing would add considerable expense in construction of a paint line, or may be burdensome or even impossible where it is necessary to work within the constraints of a manufacturing facility's existing line configuration. It has not been possible before now to commercialize such a dual system because overspray from the acrylic-based blackout primer caused unacceptable cratering in the areas coated with the uncured polyester-based primer. The usual additives that have been known in the art to control dirt cratering have been ineffective for preventing overspray cratering. Moreover, higher levels of traditional anti-cratering additives in the primer interfere with the adhesion of the topcoat or basecoat layer to the primer.

Surprisingly, we have discovered that the powder coatings of the invention, having both a very low molecular weight, crosslinkable acrylic resin component and a polyester resin component, do not exhibit any incompatibility with acrylic-based powder coatings applied on adjacent areas, such as produced unacceptable cratering or fuzziness in the film when conventional polyester-based powder primers were used. At the same time, the powder coating of the invention has excellent application and storage characteristics.

SUMMARY OF THE INVENTION

The present invention provides, in one aspect, a thermosetting powder coating composition resistant to overspray incompatibility defects that comprises solid particulates of a uniform mixture of (a) a polyester resin having an average of two or more carboxyl groups, (b) a first crosslinker reactive toward the carboxyl groups of the polyester resin, (c) from 1% to 20% of a reactive acrylic copolymer, and (d) a second crosslinker reactive toward the reactive functionality of the acrylic copolymer. The acrylic copolymer has a weight average molecular weight of from 10,000 to 40,000.

Another aspect of the present invention provides for a method of coating a substrate, wherein two powder coating compositions are applied to adjacent or overlapping areas of a substrate and then simultaneously cured to produce a cured coating layer on the substrate. One of the powder coating compositions applied is the powder coating of the invention as previously described, comprising the polyester resin, the acrylic copolymer, and the first and second crosslinkers. The second powder coating composition is also a thermosetting composition, and it comprises a second acrylic copolymer having reactive functionality and a third crosslinker that is reactive toward the second acrylic copolymer. The acrylic copolymers of the two compositions may be identical, but this is not required. The second acrylic copolymer can have significantly different properties in order to suit the properties of the second powder coating composition to the use for which it is to be applied. In particular, it may be preferred that the second acrylic copolymer have a higher molecular weight. Likewise, the second powder coating composition and the composition of the invention may or may not share a common crosslinker or crosslinking mechanism.

After the applied powder compositions are cured, the cured layer may then be overcoated with another coating layer. For example, a one-layer enamel topcoat composition or a two-layer basecoat/clearcoat topcoat composition may be applied and cured in ways known in the art. There is excellent intercoat adhesion between the primer of the invention and conventional topcoat formulations.

Yet another aspect of the present invention provides for a coated article. The coated article is prepared according to the methods described, using the thermosetting powder coating composition of the invention. The coated article may be, for example, an automotive body.

The powder coating compositions of the present invention are particularly useful in a process where there is a risk of contamination of the polyester-based coating with an acrylic coating that would ordinarily cause cratering or fuzziness of the film. Such situations arise when the two technologies are sprayed on adjacent or overlapping surfaces and cured in one bake. Incompatibility defects may also arise when there is a changeover from the use of one technology to the use of the other in the same application equipment.

The compatibility of the powder coating composition of the invention toward the acrylic-based second coating composition is of great utility in applications where the polyester-based powder coating primer composition has properties that are preferred on one part of an article, while an acrylic-based powder coating primer composition has properties that are more suitable for another part of the article. For example, the greater flexibility, chip resistance, or impact strength of the polyester-based coating may be desirable in certain areas, while the smoothness, gloss, and durability of an acrylic-based coating is desirable in other areas. The compatibility of the composition of the invention with acrylic-based compositions allows both coatings to be applied in the same spraybooth and cured during the same baking operation.

DETAILED DESCRIPTION OF THE INVENTION

The polyester resin of the invention has an average of two or more carboxyl groups. Such polyester resins are obtained by the condensation reaction between a polyol component and a poly-functional acid component. The equivalents of acid are in excess so that an acid-functional polyester is formed. Preferably, the polyester resin has an acid number of 30 to 38 mg KOH/g. The polyester resin also preferably has a Tg of 50 to 60° C. The viscosity of the polyester, as measured at 200° C., is preferably from 4500 to 5500 mPaos.

The poly-functional acid component comprises compounds having two or more carboxyl groups or their anhydrides. Such compounds may be alkyl, alkylene, aralkylene, or aromatic compounds. Dicarboxylic acids and anhydrides are preferred. Acids or anhydrides with higher functionality may be used where some branching of the polyester is desired. When tri-functional compounds or compounds of higher functionality are used, it is also possible to include mono-functional carboxylic acids or anhydrides of monocarboxylic acids, such as versatic acid, fatty acids, or neodecanoic acid, so long as the poly-functional acid component has an average functionality of at least two.

Illustrative examples of materials suitable as the compounds having two or more carboxyl groups or anhydrides of such compounds include phthalic acid, phthalic anhydride, isophthalic acid, terephthalic acid, hexahydrophthalic acid, tetrachlorophthalic anhydride, hexahydrophthalic anhydride, pyromellitic anhydride, succinic acid, azeleic acid, adipic acid, 1,4-cyclohexanedicarboxylic acid, citric acid, and trimellitic anhydride.

The polyol component used to make the polyester resin also has an average functionality of at least two. The polyol component may contain mono-, di-, and tri-functional alcohols, as well as alcohols of higher functionality. Diols are preferred as the polyol component. Alcohols with higher functionality may be used where some branching of the polyester is desired, and mixtures of diols and triols are also preferred as the polyol component.

Examples of useful polyols are ethylene glycol, diethylene glycol, triethylene glycol, propylene glycol, dipropylene glycol, butylene glycol, glycerine, trimethylolpropane, trimethylolethane, pentaerythritol, neopentyl glycol, 2,2,4-trimethyl-l,3-pentanediol, 1,6-hexanediol, 1,4-cyclohexane dimethanol, hydrogenated bisphenol A, and hydoxyalkylated bisphenols.

The methods of making polyester resins are well-known. Polyesters are typically formed by heating together the polyol and poly-functional acid components, with or without catalysis, while removing the by-product of water in order to drive the reaction to completion. A small amount of a solvent, such as toluene, may be added in order to remove the water azeotropically. If added, such solvent is preferably removed from the polyester product before powder coating formulation is begun.

Many polyester resins are commercially available as 100% solid materials that can be used in powder coating compositions, such as those sold by Hoechst, Portsmouth, Virginia 23704, under the tradename Alftalat; by EMS-American Grilon, Inc., Sumter, S.C. 29151, under the tradename Grilesta; and by CIBA-Geigy Corporation, Ardsley, N.Y. 10502, under the tradename Arakote.

The thermosetting powder coating composition of the invention further includes a first crosslinker that is reactive toward the carboxyl groups of the polyester resin. Examples of materials suitable as the first crosslinker include epoxy-functional compounds, such as epoxy-functional epoxy resins, epoxy-functional acrylic resins, and triglycidyl isocyanurate; polyoxazolines; and polydioxanes.

Examples of epoxy-functional epoxy resins include bisphenol A-type epoxy resins, novolac epoxy resins, and alicyclic epoxy resins. Epoxy resins based on bisphenol A are preferred. The epoxy resins preferably have epoxy equivalent weights between 500 and 2000, and more preferably between 600 and 1000.

Solid epoxy resins suitable for use in powder coatings are readily available commercially, such as, for example, from Dow Chemical Co., Midland, Mich. 48674, under the tradename D.E.R.; from CIBA-Geigy Corp., Ardsley, N.Y. 10502, under the tradename Araldite; and from Hoechst, Portsmouth, Va. 23704, under the tradename Beckopox.

The polyester resin and the first crosslinker are apportioned in the coating so that the equivalents of polyester to the equivalents of the first crosslinker are preferably in a ratio of between 0.8 and 1.2: 1, and more preferably in a ratio of about 1:1.

The polyester resin is utilized in an amount between 90 and 10 % by weight, and preferably in an amount between 60 and 20 % by weight, based on total coating composition weight. The crosslinking agent is utilized in amounts between 10 and 90 % by weight, and preferably in amounts between 20 and 50 % by weight, based on total weight of the coating composition.

The thermosetting powder coating composition of the invention also includes from 1% to 20% of a reactive acrylic copolymer. The acrylic copolymer has a weight average molecular weight of from 10,000 to 40,000. Preferably, the weight average molecular weight of the acrylic copolymer is from 10,000 to 25,000. Alternatively, an acrylic copolymer having a weight average molecular weight of from 10,000 to 20,000 is preferred. In yet another preferred embodiment of the invention, the acrylic copolymer has a weight average molecular weight of from 15,000 to 20,000.

The monomers are selected and apportioned so that the acrylic copolymer has a theoretical Tg of from 25° C. to 60° C. If the Tg of the acrylic copolymer is too high, then the appearance of the film may be poor; while, if it is too low, the powder coating composition will tend to sinter. In a preferred embodiment of the invention, the acrylic copolymer has a theoretical Tg of from 25° C. to 45° C. Alternatively, an acrylic copolymer having a theoretical Tg of from 25° C. to 40° C. is preferred.

The acrylic copolymer also has reactive functionality such that its equivalent weight is from 600 to 1000, more preferably from 600 to 900, and most preferably from 700 to 800. The reactive functionality is preferably carboxyl, acid anhydride, hydroxyl, isocyanate, epoxy, or amine functionality. More preferably the reactive functionality is carboxyl or hydroxyl functionality. Most preferably the reactive functionality is hydroxyl functionality.

The reactive functionality is usually added to the acrylic copolymer by including amongst the monomers reacted one or more monomers with the desired functionality. The desired functionality may be also be introduced through a further reaction of the fully-reacted copolymer.

For example, hydroxyl-functional acrylic copolymers may be formed by polymerization using hydroxyethyl acrylate, hydroxybutyl acrylate, hydroxybutyl methacrylate, or hydroxypropyl acrylate; amino-functional acrylic copolymers by polymerization with t-butylaminoethyl methacrylate and t-butylaminoethylacrylate; epoxy-functional acrylic copolymers by reaction with glycidyl acrylate, glycidyl methacrylate, or allyl glycidyl ether; carboxyl-functional acrylic copolymers by reaction with α,β-ethylenically unsaturated monocarboxylic acids containing 3 to 5 carbon atoms and other vinylic acids, such as acrylic acid, methacrylic acid, crotonic acid, itaconic acid, maleic acid, fumaric acid; and anhydride-functional acrylic copolymers by reaction with maleic anhydride or itaconic anhydride.

Other ethylenically unsaturated monomers that may be used in forming the acrylic copolymer having reactive functionality include esters or nitriles or amides of α,β-ethylenically unsaturated monocarboxylic acids containing 3 to 5 carbon atoms; vinyl esters, vinyl ethers, vinyl ketones, vinyl amides, and vinyl compounds of aromatics and heterocycles. Representative examples include acrylic and methacrylic acid amides and aminoalkyl amides; acrylonitrile and methacrylonitriles; esters of acrylic and methacrylic acid, particularly those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, and isobornyl acrylates and methacrylates; esters of fumaric, maleic, and itaconic acids, like maleic aid dimethyl ester and maleic acid monohexyl ester; vinyl acetate, vinyl propionate, vinyl ethyl ether, and vinyl ethyl ketone; styrene, α-methyl styrene, vinyl toluene, and 2-vinyl pyrrolidone.

The copolymers may be prepared by using conventional techniques, such as free radical polymerization, cationic polymerization, or anionic polymerization, in, for example, a batch, semi-batch, or continuous feed process. For instance, the polymerization may be carried out by heating the ethylenically unsaturated monomers in bulk or in solution in the presence of a free radical source, such as an organic peroxide or azo compound and, optionally, a chain transfer agent, in a batch or continuous feed reactor. Alternatively, the monomers and initiator(s) may be fed into the heated reactor at a controlled rate in a semi-batch process. Where the reaction is carried out in a solution polymerization process, the solvent should preferably be removed after the polymerization is completed. Preferably, the polymerization is carried out in the absence of any solvent.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cycohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene. The free radical polymerization is usually carried out at temperatures from about 20° C. to about 250° C., preferably from 90° C. to 170° C. The reaction is carried out according to conventional methods to produce a solid acrylic copolymer.

The composition of the invention further contains a second crosslinker that is reactive toward the reactive functionality of the acrylic copolymer. In preferred embodiments of the invention, where the acrylic copolymer has hydroxyl functionality, the second crosslinker may be amino resins, such as urea-formaldehyde or melamine-formaldehyde resins, or polyisocyanate crosslinkers, such as isocyanurates and biurets of diisocyanates, and other poly-functional isocyanate compounds, such as those formed by reaction of diisocyanates and polyols. Illustrative examples of useful polyisocyanates include polyisocyanates, such as the isocyanaurates or biurets, of isophorone diisocyanate, hexamethylene diisocyanate, toluene diisocyanate, methylene diphenyl diisocyanate, methylene dicyclohexyl diisocyanate, 2-methyl-1,5-pentane diisocyanate, 2,2,4-trimethyl-1,6-hexane diisocyanate and 1,12-dodecane diisocyanate. Polyfunctional isocyanate compounds such as the adduct of isophorone diisocyanate with trimethylolpropane may also be used.

In a preferred embodiment, the isocyanate groups of the isocyanate crosslinkers are blocked with a blocking agent. Blocking agents for reaction with the diisocyanates include oximes, such as methylethyl ketoxime, methyl-n-amyl ketoxime, acetone oxime, cyclohexanone oxime and caprolactam; malonic esters; aliphatic, cycloaliphatic, aromatic and alkyl monoalcohols, such as methyl, ethyl, chloroethyl, propyl, butyl, amyl, hexyl, heptyl, octyl, nonyl, 3,3,5-trimethylhexanol, decyl and lauryl alcohols; aromatic-alkyl alcohols, such as phenylcarbinol, ethylene glycol monoethyl ether, monobutyl ether, monopropyl ether. Other blocking agents are phenolic compounds such as phenol itself and substituted phenols where the substituents do not adversely affect the coating operations including cresol, nitrophenol, chlorophenol and t-butyl phenol. Also suitable are dibutyl amine and tertiary hydroxyl amines such as diethylethanolamine. Oxime blocking agents are preferred. One preferred blocked crosslinker, the blocked polyisocyanate of isopohorone diisocyanate, is available commercially from Hüls, Piscataway, N.J. 08855, as Vestagon B 1065.

Where the functionality of the acrylic copolymer is carboxyl, the second crosslinker may be selected from the same materials that are suitable for use as the first crosslinker, as previously described.

Where the functionality of the acrylic copolymer is glycidyl, examples of suitable crosslinking agents are polycarboxylic acids and their anhydrides such as phthalic acid, phthalic anhydride, trimellitic anhydride and pyromellitic anhydride; polyphenols such as catecol, resorcin, hydroquinone, pyrogallol and fluoroglumine; and polyamines such as ethylenediamine, metaphenylenediamine, 4,4'-diaminodiphenylmethane, 4,4'-diamino-diphenyl sulfone and 4,4'-diamino-diphenyl ether.

It may be desirable to incorporate into the powder coating composition other materials, such as fillers, pigments, leveling agents to help coalesce the film, plasticizers, flow control agents to smooth the film, air release agents, hindered amine light stabilizers and ultraviolet light absorbers, antioxidants, and/or catalysts.

Pigments may be utilized in amounts between 0 and 35 % by weight, based on total weight of the coating composition. The pigments used may be inorganic pigments, including metal oxides, chromates, molybdates, phosphates, and silicates. Examples of inorganic pigments that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, talc, barytes, ferric ammonium ferrocyanide (Prussian blue), ultramarine, lead chromate, lead molybdate, and mica flake pigments. Organic pigments may also be used. Examples of useful organic pigments are metallized and non-metallized azo reds, quinacridone reds and violets, perylene reds, copper phthalocyanaine blues and greens, carbazole violet, monoarylide and diarylide yellows, benzimidazolone yellows, tolyl orange, naphthol orange, and the like.

Flow control agents may be used to prevent the formation of dirt craters by reduction of surface tension. Dirt cratering is caused by dirt falling upon the coating before it is cured. Flow control agents are generally nonfunctional, low Tg polymers, such as acrylic or siloxane polymers or fluorinated polyesters. Examples of flow control agents commonly used are polylauryl acrylate, polybutyl acrylate, poly(2-ethylhexyl) acrylate, polylauryl methacrylate, poly-(dimethylsiloxane), and esters of polyethylene glycol or polypropylene glycol and fluorinated fatty acids.

When used, flow control agents must be used in very low amounts. When the amount of flow control agents used exceeds about 2%, the coating tends to flow too much during the melt and cure process resulting in film sagging. In addition, a primer coating using more than about 2% of the flow control agents exhibits poor intercoat adhesion to a topcoat applied as a subsequent step in the coating process.

Hindered amine light stabilizers, ultraviolet light absorbers, and anti-oxidants may be added in ways and amounts known to the art to augment the durability of the finished coating, and are particularly useful when the finished coating may be subjected to outdoor exposure.

The thermosetting powder coating compositions can be prepared by first melt blending the ingredients of the coating compositions. This process usually involves dry blending the ingredients in a planetary mixer and then melt blending the admixture in an extruder at a suitable temperature. The extrusion temperature is preferably chosen so that it is high enough to allow the resin to melt to a viscosity that produces good mixing and pigment wetting, but is not so high that any significant amount of co-reaction between resin and crosslinker occurs. The melt blending is usually carried out within the range of from 80° C. to 130° C.

The extrudate is then cooled and pulverized. The extrudate may be crushed to a fine flake or granule and then ground and classified by sieving or other means. The maximum particle size and the particle size distribution are controlled in the classifying step and affect the smoothness of the final film. Requirements for these parameters depend upon the particular use and application method.

The thermosetting powder coating composition can be applied onto many different substrates, including metal substrates such as bare steel, phosphatized steel, galvanized steel, or aluminum; and non-metallic substrates, such as plastics and composites. The substrate may also be any of these materials having upon it already a layer of another coating, such as a layer of an electrodeposited primer, cured or uncured before the application of the powder coating compositions. In a preferred embodiment, the substrate is an automotive body.

Application can be by electrostatic spraying or by use of a fluidized bed. Electrostatic spraying is the preferred method. The coating powder can be applied in one or more passes to provide a film thickness after cure of from 25 to 400 microns, but when used as an automotive primer the coating thickness is generally from 50 to 250 microns. The substrate can optionally be preheated prior to application of a powder coating composition to promote uniform and thicker powder deposition.

After application of the coating composition to the substrate, the coating is cured, preferably by heating at a temperature and for a length of time sufficient to cause the reactants to form an insoluble polymeric network. The cure temperature is usually from 160° C. to 205° C., and the length of cure is usually 15 minutes to 60 minutes. Preferably, the coating is cured at 170° C. to 180° C. for 20 to 30 minutes.

In a preferred embodiment, the powder coating composition of the invention and a second thermosetting powder coating composition are applied onto adjacent or overlapping areas of the substrate, and the two powder coating compositions are then simultaneously cured to produce a cured powder coating layer on the substrate. The powder coating composition of the invention can be applied to the substrate before the second thermosetting powder coating composition, or the second thermosetting powder coating composition can be applied to the substrate before the powder coating composition of the invention, or the two compositions may be applied simultaneously.

The second thermosetting powder coating composition comprises both an acrylic copolymer having reactive functionality and a crosslinker that is reactive toward that acrylic copolymer. Preferably, the reactive functionality is hydroxyl functionality and the crosslinker is an amino resin, such as urea-formaldehyde or melamine-formaldehyde resin, or an isocyanate crosslinker, such as an isocyanurate or biuret of a diisocyanate or other poly-functional isocyanate compound. In a particularly preferred embodiment, the reactive functionality is hydroxyl functionality and the crosslinker has blocked isocyanate groups. Such crosslinkers have been described above.

In another preferred embodiment, the reactive functionality is carboxyl functionality and the crosslinker is selected from the same materials that are suitable for use as the first crosslinker, as previously described.

The acrylic copolymer of the second thermosetting powder coating composition may be the same as the acrylic copolymer of the powder coating composition of the invention previously described. However, it may be beneficial for a particular application to use an acrylic copolymer of higher molecular weight or differing in reactive functionality, theoretical glass transition temperature, equivalent weight, or otherwise being distinct.

In a preferred embodiment, the powder coating composition of the invention is used to form a primer coating layer on the substrate. After application and curing of the powder primer layer, at least one topcoat layer is applied over at least part of the article. The topcoat can be, for example, a polyester-based, acrylic-based, or urethane-based coating cured with an amino resin, blocked polyisocyanate, or epoxy crosslinker. The topcoat composition may be solvent-based, water-based, or may be a powder coating composition. The topcoat layer may be a composite coating comprising a colored or pigmented basecoat over which is deposited a transparent or clear coat. The topcoat layer is applied according to known methods. The powder primer coating layers of the invention have excellent intercoat adhesion to such topcoats.

The following examples are provided to further illustrate the invention.

EXAMPLES

A powder coating according to the invention was prepared, along with a straight polyester-based powder coating and a straight acrylic-based coating. These coatings were used to illustrate the unique compatibility properties of the powder coating prepared according to the invention.

| Material | A | B | C |
|---|---|---|---|
| Alftalast ® AN 783[1] | — | 33.43 | 29.00 |
| Araldite ® GT 7013[2] | — | 15.92 | 12.50 |
| XB1201[3] | 53.17 | — | 6.50 |
| B 1065[4] | 35.63 | — | 3.00 |
| EX505[5] | 2.00 | 2.00 | 2.00 |
| Lancowax__ PP1362D[6] | — | 0.40 | 0.40 |
| Uraflow ® B[7] | 0.40 | 0.40 | 0.40 |
| SCX-819[8] | 3.00 | 3.71 | 2.70 |
| 30-3020[9] | — | 2.00 | 2.00 |
| Tinuvin ® 900[2] | 3.10 | 2.60 | 2.60 |
| Tinuvin ® 144[2] | 1.40 | 1.40 | 1.40 |
| R960[10] | — | 19.52 | 10.00 |
| Baramite XF[11] | — | 18.47 | — |
| Baramite[11] | — | — | 17.30 |
| Zeospheres 200[12] | — | — | 10.00 |
| FW200[13] | 1.30 | 0.10 | 0.20 |

[1]Available from Hoechst, 810 Water St., Portsmouth, Virginia 23704
[2]Available from Ciba Geigy Corp., Ardsley, New York 10502
[3]An acrylic copolymer having a weight average molecular weight of 18–20K, theoretical Tg of 38° C., actual Tg (measured by DSC) of 45–50° C., and hydroxyl equivalent weight of 756, available from Zeneca, 730 Main St., Wilmington, Massachusetts 01887
[4]A blocked IPDI adduct available from Hüls, 80 Centennial Ave., Piscataway, New Jersey 08855
[5]Available from Troy Corp., East Hanover, New Jersey 07936
[6]Available from Cray Valley Products, Stuyvesant, New York 12173
[7]Available from GCA Chemical, Bradenton, Florida 34205
[8]Available from S. C. Johnson and Son, Racine, Wisconsin 53403
[9]Available from Cargill, 2301 Crosby Rd., Wayzata, Minnesota 55391
[10]Available from DuPont, Wilmington, Delaware 19880
[11]Available from Cyprus Foote Mineral Co., Malvern, Pennsylvania 19335
[12]Available from Zelan, 220 Endicott Blvd., St. Paul, Minnesota 55101
[13]Available from Degussa, Rt. 46, Teterboro, New Jersey 07608

The above ingredients were premixed 30–90 seconds, until homogenous. The premixed blend was then extruded on a ZSK-30 (Werner Pfleider) twin screw extruder at the following conditions.
Zone 1=130° C.
Zone 2=130° C.
RPM=250

The flake was re-extruded at the above conditions. The flake was then ground on an ACM-2L mill to 22–25 microns.

The powder coatings A, B, and C thus prepared were blended in the amounts indicated in the following tables. The blended coatings were applied electrostatically, with an ONODA spray gun, Model No. GX108, onto test panels to a thickness of between 2.0 and 15 mils. The panels were baked for 30 minutes at 350° F.

The appearance of the films were examined in order to determine whether the powder blends were compatible. Compatibility was indicated by smooth and glossy films (S,G), while cratering (C) or fuzziness (F) of the film indicated incompatibility.

| POWDER BLEND RESULTS | | | | | |
|---|---|---|---|---|---|
| A | .1 | 1 | 10 | 25 | 50 |
| B | 99.9 | 99 | 90 | 75 | 50 |
| Appearance | C | C | F | F | F |
| A | .1 | 1 | 10 | 25 | 50 |
| C | 99.9 | 99 | 90 | 75 | 50 |
| Appearance | S,G | S,G | S,G | S,G | S,G |
| B | .1 | 1 | 10 | 25 | 50 |
| C | 99.9 | 99 | 90 | 75 | 50 |
| Appearance | S,G | S,G | S,G | S,G | S,G |

In a separate experiment, the powder coatings A, B, and C were applied in layers onto 4×8-inch electrocoated steel panels and baked for 30 minutes at 350° F. The baked layers were examined as before for compatibility:

Panel 1. Coating A was applied to the entire panel, followed by application of coating B to only the bottom of the panel. There was overspray to coating B onto coating A in the center of the panel.

Results: After baking, the top of the panel was smooth and glossy, but the overspray area in the center was fuzzy and the polyester-based B coating at the bottom of the panel was cratered. This panel showed the incompatibility that results in applying an acrylic-based powder coating (A) and a polyester-based powder coating (B) on overlapping or adjacent surfaces.

Panel 2. Coating A was applied to the entire panel, followed by application of coating C to only the bottom of the panel. There was overspray to coating C onto coating A in the center of the panel.

Results: All areas of the coated panel were smooth and glossy after baking. This panel showed that there is no incompatibility between an acrylic-based powder coating (A) and a powder coating of the invention (C).

We claim:

1. A thermosetting powder coating composition resistant to overspray incompatibility defects, comprising solid particulates of a uniform mixture of (a) a polyester resin having an average of two or more carboxyl groups, (b) a first crosslinker, reactive toward the carboxyl groups of the polyester resin, selected from the group consisting of epoxy-functional compounds, polyoxazolines, and polydioxanes, (c) from 1% to 20% of an acrylic copolymer having reactive functionality selected from the group consisting of hydroxyl functionality, isocyanate functionality, epoxy functionality, and amine functionality, and (d) a second crosslinker that is reactive toward the reactive functionality of the acrylic copolymer, wherein the acrylic copolymer has a weight average molecular weight of from 10,000 to 40,000.

2. The composition according to claim 1, wherein the acrylic copolymer is present in an amount of from 5% to 10%.

3. The composition according to claim 1, wherein the weight average molecular weight of the acrylic copolymer is from 10,000 to 25,000.

4. The composition according to claim 1, wherein the weight average molecular weight of the acrylic copolymer is from 10,000 to 20,000.

5. The composition according to claim 1, wherein the acrylic copolymer has a theoretical Tg of from 25° C. to 60° C.

6. The composition according to claim 1, wherein the acrylic copolymer has a theoretical Tg of from 25° C. to 45° C.

7. The composition according to claim 1, wherein the acrylic copolymer has a theoretical Tg of from 25° C. to 40° C.

8. The composition according to claim 1, wherein the reactive functionality of the acrylic copolymer is hydroxyl functionality.

9. The composition according to claim 8, wherein the crosslinker that is reactive toward the carboxyl groups of the polyester resin has epoxy groups and the crosslinker that is reactive toward the acrylic copolymer has blocked isocyanate groups.

10. The composition according to claim 9, wherein the crosslinker that is reactive toward the acrylic copolymer is a blocked aliphatic polyisocyanate.

11. The composition according to claim 1, wherein the polyester resin is present in an amount of between 90 and 10 percent by weight, and the crosslinkers are present in a combined amount of between 10 and 90 percent by weight, where weights are based upon the total weight of the resinous binder.

12. The composition according to claim 1, wherein pigment is present in an amount of up to 35 percent by weight based upon the total weight of the composition.

* * * * *